Feb. 2, 1937.  E. J. FRASER  2,069,238
TRAILER LIGHT
Filed Feb. 29, 1936  2 Sheets-Sheet 1

Witness:
W. A. Snow

Inventor
Edwin J. Fraser
by Rummler, Rummler & Woodworth
Attys.

Feb. 2, 1937. E. J. FRASER 2,069,238
TRAILER LIGHT
Filed Feb. 29, 1936 2 Sheets-Sheet 2
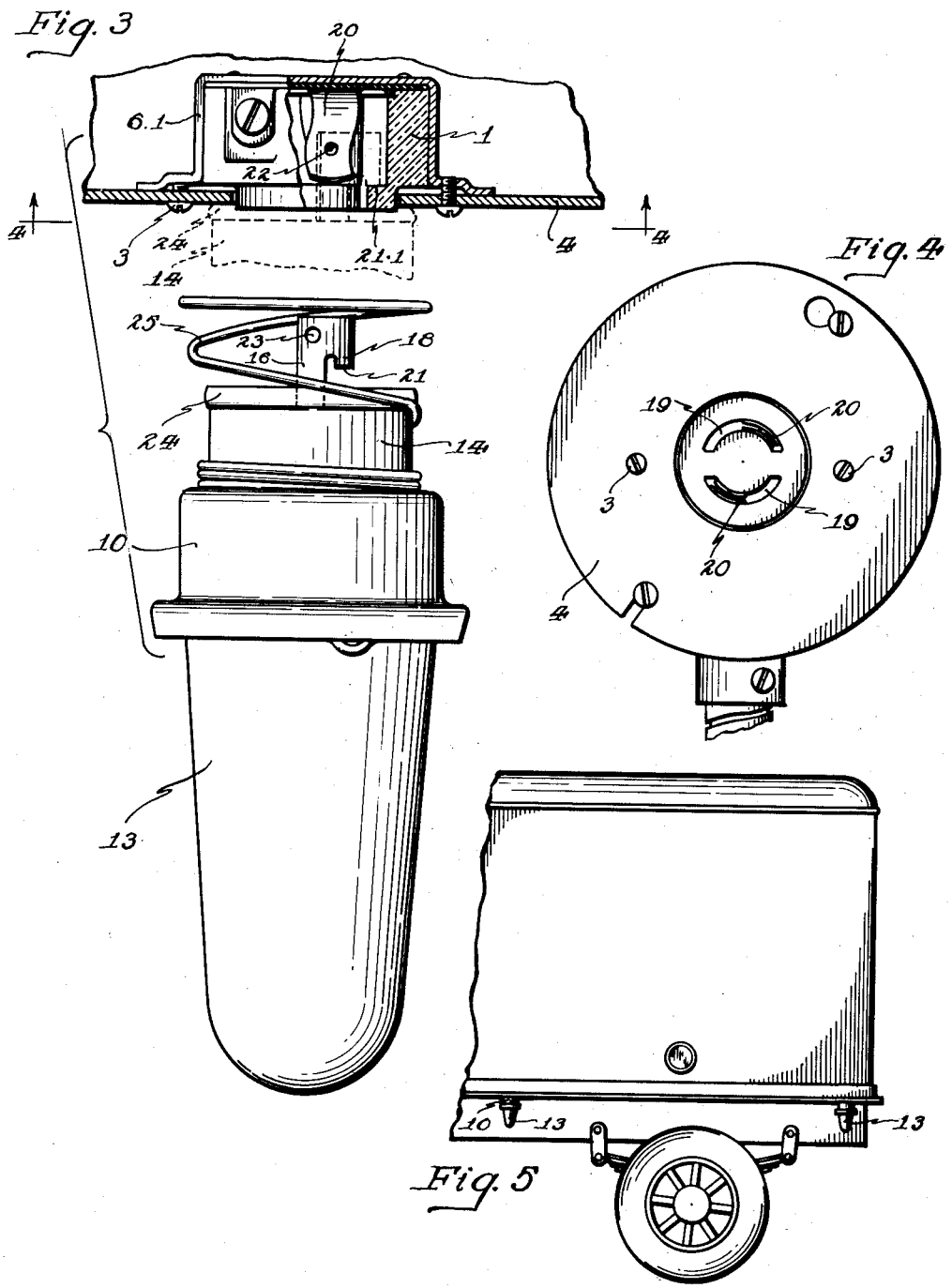
Inventor
Edwin J. Fraser Patented Feb. 2, 1937

2,069,238

UNITED STATES PATENT OFFICE 2,069,238

TRAILER LIGHT

Edwin J. Fraser, Riverside, Ill., assignor to Keeshin Motor Express Co. Inc., Chicago, Ill., a corporation of Illinois Application February 29, 1936, Serial No. 66,403

3 Claims. (Cl. 240—7.1)

This invention relates to improvements in methods and means for lighting trailers and to improvements in the lighting units themselves.

Heretofore the riding lights on trailers were generally set, or built, directly into the trailer body and were therefore difficult to dismantle for insertion of new bulbs, or repair, upon their being broken or smashed, so that the problem of maintenance had become a serious expense. These riding lights were also difficult to repair or replace when on the road as the trailer body was usually broken or dented when an accident occurred so that it was necessary to continue without proper lighting, in direct violation of the State laws, and without sufficient light protection for the trailer itself. Furthermore, most of the trailers as manufactured are only provided with two riding lights located at the rear and one located on the port side at the forward end so that in order to comply with the various laws of the several States it is necessary for the purchaser to install additional lights according to the States in which the trailer is to be operated. Also, if the trailer is to be operated in several States, the maximum number of lights must be provided which results in an unnecessary expense and battery drain when the vehicle is being operated in States where a lesser number of lights is required.

It was to overcome these and other inherent difficulties and disadvantages that the present invention has been devised.

The main objects of this invention are to provide an improved method and means of lighting trailers; to provide, as an article of manufacture, a new and improved trailer riding light; to provide a riding light of the character described which is detachably secured to the trailer; to provide a trailer light which is removable and readily replaceable; and to provide an improved trailer light that is simple in construction and operation and inexpensive to manufacture.

An illustrative embodying of this invention is shown in the accompanying drawings in which:

Fig. 3 is a partially sectioned view of the receptacle, showing the light unit in full lines and detached from the receptacle, and the operating position of the light unit base in dotted outline.

Fig. 4 is a face view of the receptacle and box, and

Fig. 5 is a fragmentary side view of the rear end of a trailer showing trailer lights in operating position.

Figure 1:
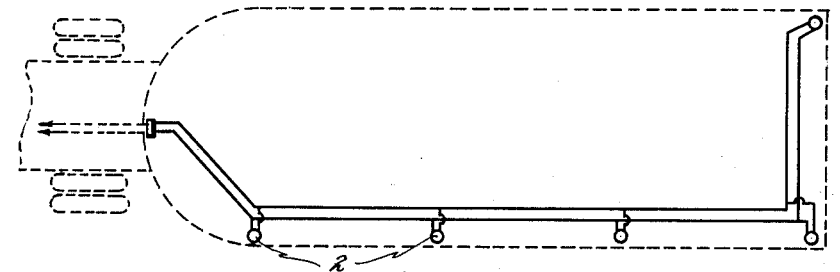
Fig. 1 is a diagrammatic view of the arrangement of my improved system of trailer lighting.
Figure 2:
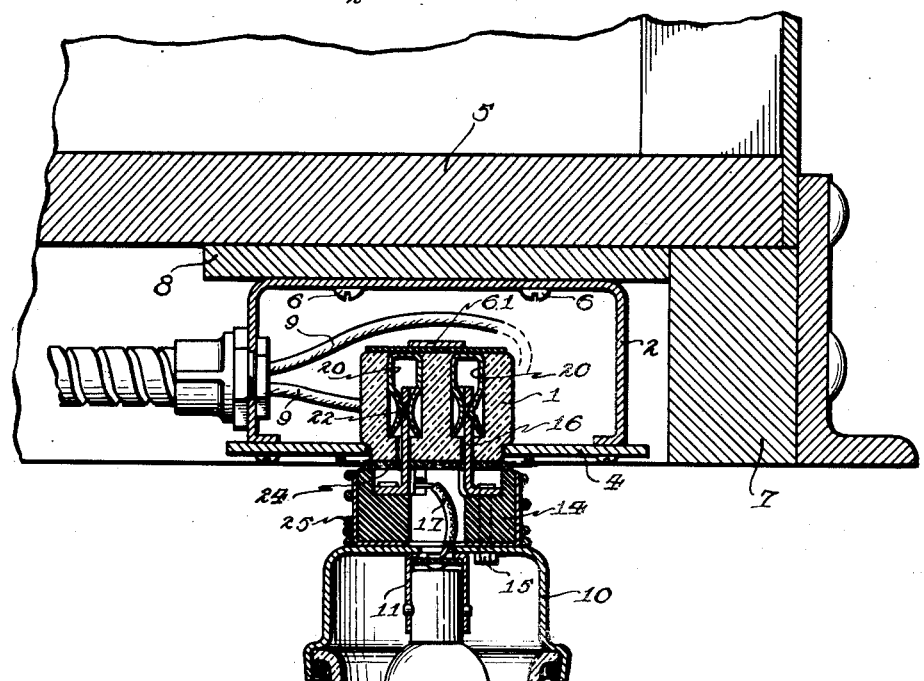
Fig. 2 is a cross sectional view showing a portion of the trailer body with one of my improved lighting units and receptacles in operating position.

Referring in detail to the drawings, my improved trailer light comprises a receptacle 1 mounted in an outlet box 2 by means of screws 3, (Fig. 3), which engage a bracket or yoke 6.1 and secure the receptacle to a cover plate 4. The outlet box 2 is secured to the under side of the floor boards 5 of the trailer, by means of wood screws 6, adjacent the trailer side frames 7. The cover plate of the outlet box is preferably located in a plane substantially parallel with the lower face of the side frames 7 as shown in Fig. 2, and if the depth of the side frames 7 is greater than that of the box 2, so that the box cannot be secured directly to the floor boards, spacing blocks 8 are employed between the box and the floor boards. The receptacle 1 is connected to a source of current not shown, usually a battery, through wires 9—9.

The lighting unit comprises a lamp casing 10, a lamp socket 11, a lamp or bulb 12, a lens 13, and a connector 14 arranged in the form of an attachment plug.

The connector 14 is secured to the lamp casing 10 by suitable fastening means such as bolts 15 or the like to produce a unitary construction. Contact fingers 16—16 are suitably secured to the connector 14, one being connected to an insulated central contact in the lamp socket 11 through wire 17 and the other being grounded to the casing 10 to which the socket 11 is directly fastened. Each finger 16 is provided with a laterally projecting arm 18 formed on one side, and each finger and arm is curved in the lateral direction so as to be received in the receptacle 1 through the arcuate apertures 19 to engage the contact members 20—20 housed within the receptacle.

The contact fingers 16 are arranged so that after they have been inserted into the receptacle and engaged with the contact members 20, and the connector unit turned clockwise, the lower portions 21 of arms 18 will engage and rest upon shoulders 21.1, formed in the receptacle, thereby locking the lighting unit in operating position and obviating the possibility of the lighting unit being shaken, jarred, or otherwise inadvertently loosened and detached from the receptacle. When it is desired to remove the lighting unit from the receptacle, the unit is merely turned counter-clockwise to disengage the arms 18 from the shoulders 21.1 and withdrawn.

The contact members 20—20 are connected to the wires 9—9 and are so arranged in the receptacle that the contact fingers 16 immediately come into frictional clamping engagement therewith upon being inserted into the receptacle, the members 20 each comprising opposed converging resilient portions between which the respective fingers 16 are gripped.

To further secure the fingers 16 in the receptacle and in engagement with the members 20, one of the resilient portions of each contact member is provided with an inwardly projecting knob or protrusion 22 which is positioned and arranged to seat in a suitably located aperture 23 in the respective finger 16 when the lighting unit is in its locked operating position.

The device is also provided with a resilient gasket like means 24, made of sponge rubber or the like and disposed on the connecting end of the unit, which performs the dual function of keeping water, dirt, gravel, etc., out of the connection between the unit and the receptacle and providing a cushion to prevent and absorb any vibration of the lighting unit relative to the receptacle.

In the form shown a helical compression spring 25 is placed around the body of the connector 14 and arranged to engage the end of the lamp casing 10 and the cover 4 of the receptacle box as an additional means to secure a tight, non-wobbly connection and joint, and to keep the locking portions 21 in engagement with the shoulders 21.1, although the employment of this spring is optional.

It will be readily seen that the present invention completely cures the defects and shortcomings of the usual trailer lighting devices and systems. Also when using my devices, the trailer driver may readily and quickly remove the lighting units from the receptacles when he arrives at a terminal, thus preventing thefts thereof. Further, each trailer may be provided with spare lighting units in its tool kit, so that in the event of breakage or pilferage while on the road, a new lighting unit can readily be placed in operation; and, when the trailer is returned to the garage after a run, the mechanic during his routine inspection can readily test and check each lighting unit to make sure that the trailer is carrying at least the minimum legal complement of serviceable units as well as a proper number of spares.

Although but one specific embodiment of this invention is herein shown and described, it will be understood that details of the construction shown may be altered or omitted without departing from the spirit of this invention as defined by the following claims.

I claim:

1. A trailer light of the class described comprising an outlet box, and a receptacle mounted therein having contact members connected to a source of current, said outlet box being mounted under the floor boards and adjacent an edge of a trailer body, in combination with a detachable lighting unit comprising a casing, lamp socket, lamp, lens, and an attachment plug having protruding contact fingers, said plug being formed and arranged for integral attachment to a face of said casing, all operatively arranged in a unitary structure, and resilient cushion means mounted on said attachment plug and arranged to effect a tight connection between said lighting unit and receptacle when the same are connected together.

2. A trailer light of the class described comprising an outlet box, a receptacle mounted therein having an electric contact member connected to a source of current, said outlet box being mounted under the floor boards adjacent the edge of the trailer body and the lower face thereof being in a line substantially flush with the lower exposed edge of the side frame, a detachable lighting unit comprising a casing, a lamp socket in said casing, a lamp in said socket, a lens on said casing enclosing said lamp socket and lamp, and an insulating member connected to said casing and having electric contact member for quick connection with said contact member of said receptacle.

3. A trailer light of the class described comprising an outlet box, a receptacle mounted therein having electric contact members connected to a source of current said outlet box being mounted under the floor boards adjacent the edge of the trailer body and the lower face thereof being in a line substantially flush with the lower exposed edge of the side frame, a detachable lighting unit comprising a casing, a lamp socket in said casing, a lamp in said socket, a lens on said casing enclosing said lamp socket and lamp, and an insulating member connected to said casing and having electric contact fingers formed with protruding arm portions for quick and positive connection with said contact members of said receptacle.

EDWIN J. FRASER.